United States Patent [19]
Reese, Jr.

[11] Patent Number: 5,667,866
[45] Date of Patent: Sep. 16, 1997

[54] MULTI-LAYERED, UNBALANCED SANDWICH PANEL

[75] Inventor: Roy Jefferson Reese, Jr., Owasso, Okla.

[73] Assignee: The Nordam Group, Inc., Tulsa, Okla.

[21] Appl. No.: 432,891

[22] Filed: May 2, 1995

[51] Int. Cl.[6] ...................................................... B32B 9/00
[52] U.S. Cl. ........................ 428/116; 428/118; 428/119; 428/73; 428/212; 428/213; 428/215; 428/218; 428/219
[58] Field of Search .................................. 428/116, 118, 428/119, 73, 212, 213, 215, 218, 219, 220, 298, 301, 303; 52/808

[56] References Cited

U.S. PATENT DOCUMENTS

| | | |
|---|---|---|
| 3,963,846 | 6/1976 | Bourke ........................................ 428/73 |
| 4,251,579 | 2/1981 | Lee ............................................. 428/73 |
| 4,292,356 | 9/1981 | Whitmore et al. ........................ 428/116 |
| 4,382,108 | 5/1983 | Carroll et al. ............................ 428/326 |
| 4,399,642 | 8/1983 | Bard et al. .................................. 52/483 |
| 4,416,349 | 11/1983 | Jacobs ...................................... 181/208 |
| 4,990,391 | 2/1991 | Veta et al. ................................. 428/116 |
| 5,106,668 | 4/1992 | Turner et al. ............................. 428/116 |
| 5,338,594 | 8/1994 | Wang ......................................... 428/117 |
| 5,445,861 | 8/1995 | Newton ..................................... 428/116 |

*Primary Examiner*—Timothy Speer
*Attorney, Agent, or Firm*—Head, Johnson & Kachigian

[57] ABSTRACT

A multi-layered, unbalanced, bonded sandwich panel having improved top load support capability per unit of weight is disclosed. The panel has a core, to the upper surface of which is affixed a multiple-ply top laminate. Similarly affixed to the lower surface of the core is a multiple-ply bottom laminate. The top laminate is thicker than the bottom laminate and supplies increased compressive resistance, while the bottom layer has an enhanced ability to withstand tensile forces. The core is preferably a honeycomb core, and unidirectional, fiberglass epoxy prepreg lamina are favored for each ply.

17 Claims, 2 Drawing Sheets

MULTI-LAYERED, UNBALANCED SANDWICH PANEL

BACKGROUND OF THE INVENTION

1. Technical Field

The present invention relates generally to structural sandwich panels, and more specifically to multi-layered, oriented unidirectional fiber panels wherein the relative thickness of upper and lower laminae are manipulated to improve the load carrying properties of such panels without incurring a weight penalty.

2. Background

Various types of sandwich panels are disclosed in U.S. Pat. Nos. 3,963,846; 4,251,579; 4,292,356; 4,416,349; 4,990,391; and 5,106,668. Some panels have solid cores, while others are cavitated. A level, or smooth, surface covering is usually placed over the core material. Most commercial paneling is flat, although beneficial curved panels are known. (See U.S. Pat. Nos. 5,064,493 and 5,126,183).

Though there are many uses for structural sandwich panels, they have been found to be particularly useful in aircraft, as typically they are light but strong. U.S. Pat. Nos. 4,292,356; 4,416,349; and 4,990,391 disclose sandwich panels for aircraft noise attenuation purposes. This type of panel is meant to reduce interior noise by damping the vibrations of a reinforced skin structure. This is thought also to improve the sonic fatigue life of the vibrating structure and attached equipment.

U.S. Pat. No. 4,251,579 concerns the use of honeycomb sandwich panels in aircraft and other vehicles to fight fire. A fire-extinguishing fluid is disposed within the honeycomb cells and is held therein by facing sheets. The panel is arranged so that it is more rigidly enclosed on one side than the other. On impact, or entry of a projectile, the facing sheet on the less rigidly enclosed side of the panel preferentially breaks up or peels away so that the fire-extinguishing fluid is discharged in the preferred direction.

Honeycomb sandwich panels have long been used in aircraft flooring. Yet there remains a significant trade-off between strength and weight that is critical to aircraft design and operation. Aircraft flooring must have compressive properties sufficient to withstand the weight of loaded fixtures (such as seats), the walking of passengers and crew and the like, while at the same time being light enough so as not to create an undue weight burden. The advantages of stronger and lighter flooring materials being known, the search has continued for better designs.

U.S. Pat. No. 5,106,668 embodies one attempt to create a stronger structural sandwich panel. It uses a multi-layer dual honeycomb structure. A high-density first honeycomb core is attached to a second, low-density honeycomb core. The two honeycomb cores share a common septum or interior structural skin.

It is believed that unbalanced panels, such as an aluminum skin bonded to a balsa core, have been used in some aircraft flooring applications. Unbalanced woven glass skin panels are known to be used in bulkheads, cabinetry and smaller aircraft flooring.

It is an object of the present invention to advance the art of structural sandwich panels for use in aircraft flooring (and other applications) by further increasing the compressive strength and structural integrity of sandwich panels without incurring a weight penalty.

SUMMARY OF THE INVENTION

According to the present invention, the foregoing and other objects and advantages are attained by manipulating the thickness of the top and bottom laminates of the panel to alter strength and stiffness such that the top laminate is made to withstand greater compressive forces while the bottom laminate is provided with enhanced tensility.

In accordance with the invention, there is provided a multi-layered, unbalanced, bonded sandwich panel having improved top load support capability per unit of weight. The panel has a core, to the upper surface of which is affixed a multiple-ply top laminate. Similarly affixed to the lower surface of the core is a multiple-ply bottom laminate. Several preferred thicknesses are provided for the top and bottom laminates and for the ply components of the laminates. The top laminate supplies increased compressive resistance, while the bottom layer has an enhanced ability to withstand tensile forces. The core is preferably a honeycomb core. Unidirectional, fiberglass epoxy prepreg lamina are favored for each ply, although the invention is not limited to the use of this fiber and resin system. Carbon fiber, aromatic polyamides, (aramids), such as are sold by Du Pont under the trademark "KEVLAR," or other fibers, as well as phenolic or polyamide resin systems, could be used.

Another aspect of the invention is the orientation of the multiple lamina upon the honeycomb core. It should be understood that a honeycomb core constructed in accordance with standard practice is known to have a "ribbon direction," defined by the direction in which the ribbons of material used to form the honeycomb core longitudinally extend. The top laminate provided herein preferably includes an inner ply having a fiber direction perpendicular to the core's ribbon direction and an outer ply having a fiber direction parallel to the ribbon direction. Likewise, the bottom laminate preferably includes an inner ply having a fiber direction perpendicular to the core's ribbon direction and an outer ply having a fiber direction parallel to the ribbon direction. Although the outer and inner plies of the laminates are always perpendicular to each other, the fiber direction of the inner plies can be oriented perpendicular or parallel to the core ribbon direction.

The panels of the present invention have been shown to have advantages over those of the prior art through standard testing procedures for characteristics such as stabilized core compression, impact strength, load deflection, panel shear, long beam flexure, insert shear, and drum peel value.

Still other objects and advantages of the present invention will become readily apparent to those skilled in this art from the following detailed description, wherein there is shown and described only the preferred embodiment of the invention, simply by way of illustration of the best mode contemplated for carrying out the invention.

As will be realized, the invention is capable of modifications in various obvious respects, all without departing from the invention. Accordingly, the description should be regarded as illustrative in nature, and not as restrictive.

DETAILED DESCRIPTION OF THE PREFERRED EMBODMENT

Figure 1:
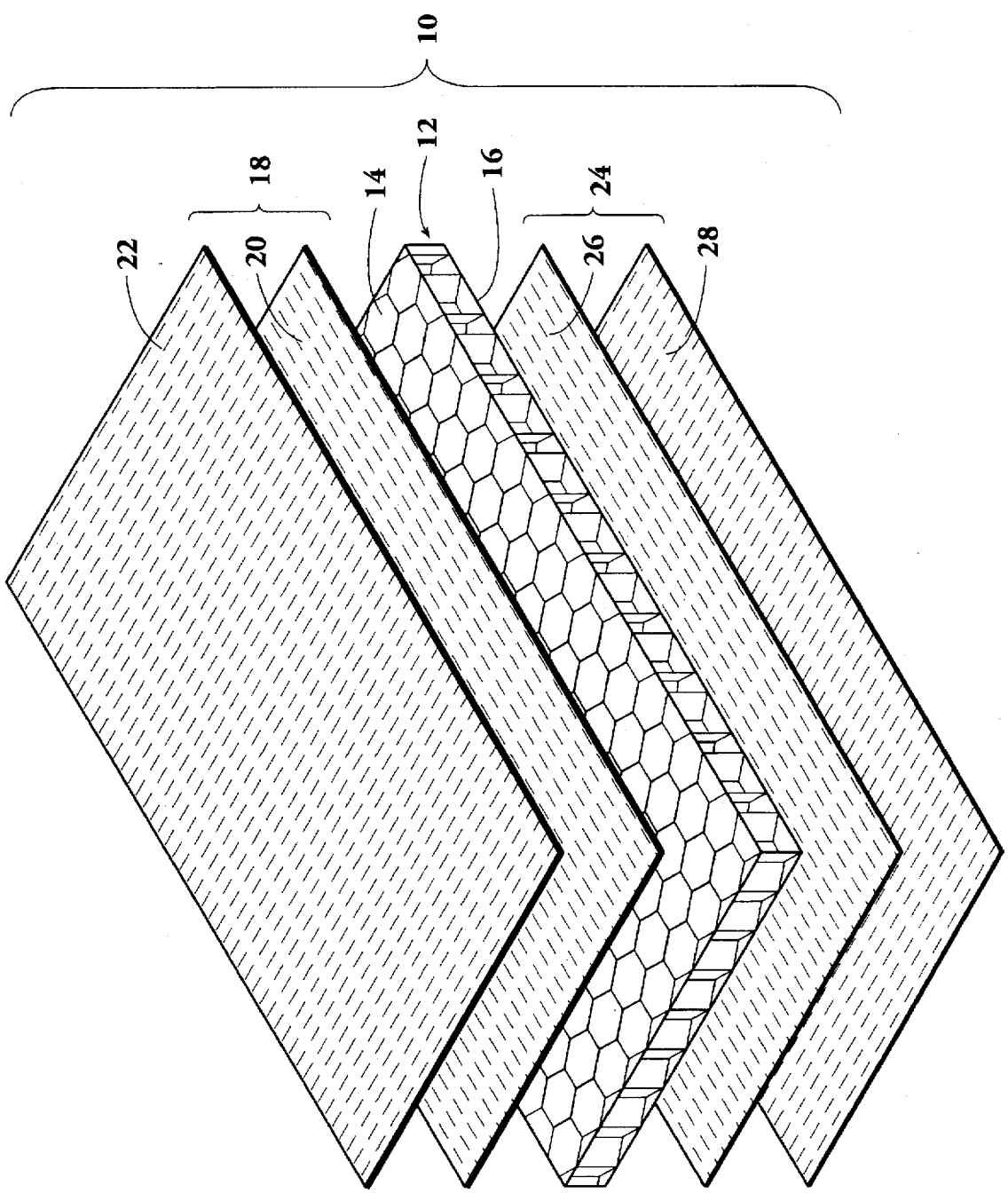
FIG. 1 is an exploded perspective view of the preferred embodiment of the invention.
Figure 2:
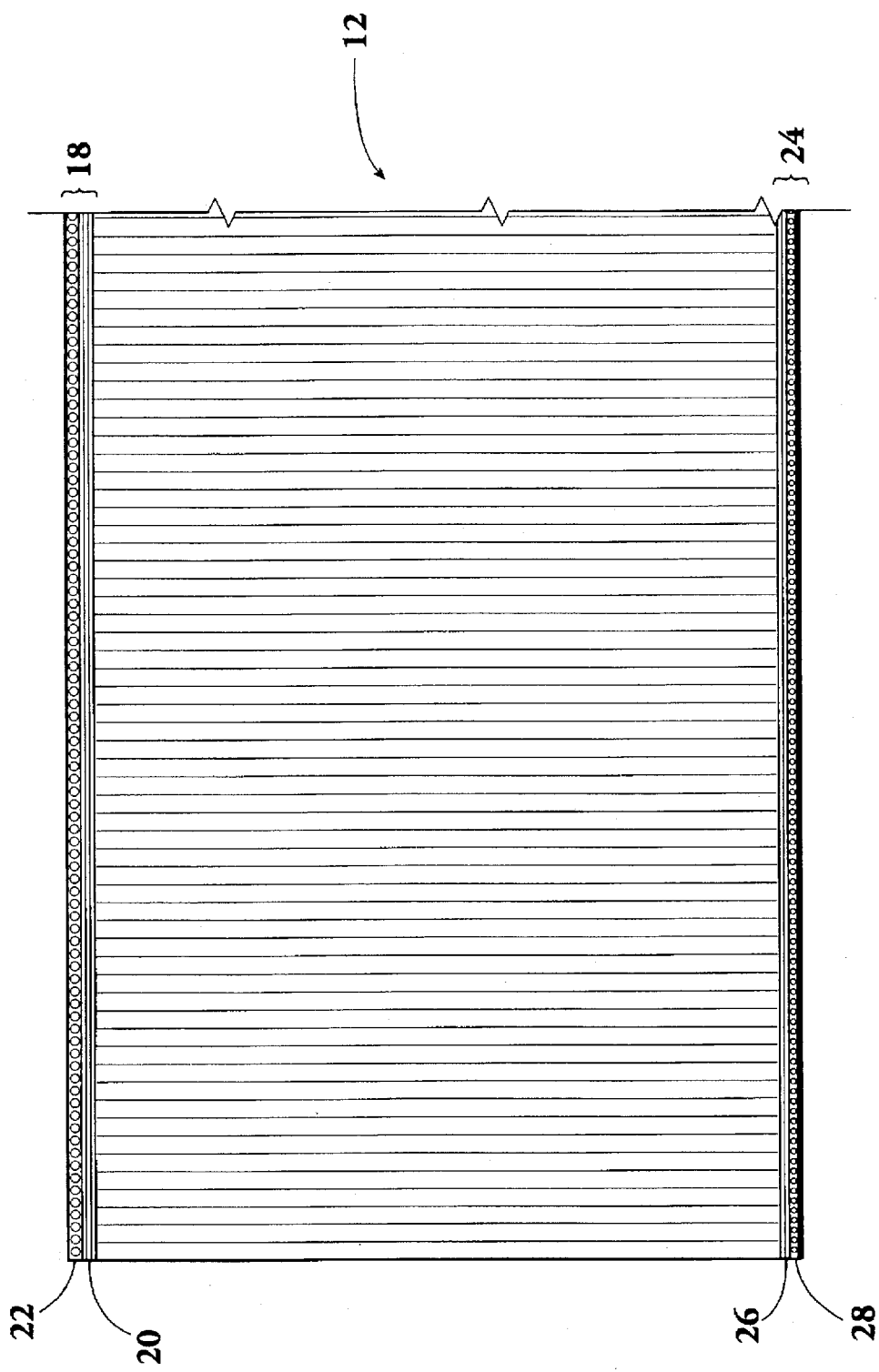
FIG. 2 is a enlarged sectional view of the preferred embodiment.

Referring to FIGS. 1 and 2, the preferred panel of the present invention is generally indicated by the reference numeral 10. Panel 10 includes a core 12. Core 12 has an upper surface or upper cell edge 14, a lower surface or lower cell edge 16, and a known ribbon direction (as described above). A honeycomb core is favored, although other suitable core configurations will suffice. The invention is not limited in any fashion to one or more particular core materials, and a variety of substances are acceptable, metallic and nonmetallic. Aluminum, aramid or aramid/phenolic sheet structures, such as are sold by Du Pont under the trademarks "NOMEX" and "KOREX", thermoplastics, glass and balsa are examples. The core should, however, have mechanical and physical properties making it readily adaptable to current manufacturing techniques.

Should a metallic core be desired, and such is preferred, the well known "5052" aluminum alloy honeycomb core is recommended. An ⅛ inch cell, 5052 aluminum alloy with a nominal density of 8.1 lbs./ft³ is preferred.

Nonmetallic honeycomb cores, however, are preferred for certain applications. They generally consist of thin sheets of pressed nonmetallic material coated with resin, bonded with an adhesive, and expanded or formed into specific cell sizes. The core material is cured sufficient to withstand machining without excessive node bond (bonded area between cells) or cell wall failure. The preferred I nonmetallic honeycomb core is a phenolic coated aramid sheet structure having a mass density of about 5.0 lbs./ft³. An alternative core is similarly composed, but has a mass density of about 9.0 lbs./ft³.

The preferred core splice adhesive for use in manufacturing the panels of the present invention, if such is necessary, is a structural foaming adhesive, such as a low density expandable epoxy film.

Core 12 should be uniform in quality and condition, clean and free from foreign materials, excess resin accumulations, starved areas, dip-coat separations, tackiness, blisters, splices, and other defects detrimental to fabrication, appearance and performance.

A top laminate 18 is adhesively affixed, in a manner well known in the art, to upper cell edge 14 of core 12. Top laminate 18 is a multiple-ply laminate. Preferably, top laminate 18 comprises an inner ply 20, which is mated to upper cell edge 14 of core 12. An outer ply 22 is affixed above inner ply 20.

A bottom laminate 24 is similarly affixed to bottom cell edge 16 of core 12. Bottom laminate 24 is also a multiple-ply laminate. It preferably comprises an inner ply 26 mated to bottom cell edge 16 of core 12, and an outer ply 28. Top laminate 18 is thicker than bottom laminate 24 as described in detail below.

The materials used for top laminate 18 and bottom laminate 24 may vary, and include glass epoxy, graphite and around fibers. The preferred material is a unidirectional, fiberglass epoxy prepreg. It consists of collimated glass fibers which are coated or impregnated with a modified epoxy resin system. The weight, resin content and color of the epoxy prepreg may be varied depending upon design specifications. The resin used for coating of the reinforcing fiber should meet or exceed the mechanical requirements of MIL-R-9299, Type II, Class 1 materials.

Similar to the requirements for core 12, the laminate material should be uniform in quality and condition and be clean and free from foreign materials, excess resin accumulation, resin starved areas, and excessive tackiness. The laminate material should have no gaps between fibers greater than 0.05 inch and should have no splices or other defects detrimental to fabrication, appearance, and performance of the end item. It should also be capable of machining without fraying or delamination.

For the preferred embodiment, the panels are fabricated by first dehydrating the NM 0104-002 Type I or II honeycomb core for a minimum of one hour at 220°±15° F. in a hot air circulating oven. The NM 5015 Class I and II prepreg materials are warmed to room temperature as is the foaming adhesive. (The prepreg material and adhesive are stored at a temperature below 0° F.) The layup and holding of components prior to cure should take place in the 65° to 85° F. range.

The unidirectional, fiberglass epoxy prepreg plies 20, 22, 26, 28 are then adhesively affixed to core 12 in the following preferred orientation. Top inner ply 20 is affixed to upper surface 14 of core 12 so that its fiber direction runs perpendicular to the ribbon direction of core 12. Top outer ply 22 is then overlaid top inner ply 20 such that the fiber direction of top outer ply 22 runs parallel to the ribbon direction of core 12 (and perpendicular to that of top inner ply 20). In a corresponding fashion, bottom inner ply 26 is affixed to bottom surface 16 of core 12; the fiber direction running perpendicular to the ribbon direction (and parallel to that of top inner ply 20). Bottom outer ply 28 is overlaid bottom inner ply 26; the fiber direction running parallel to the ribbon direction (and parallel to that of top outer ply 22). Thus, top inner ply 20 and bottom inner ply 26 both have a fiber direction that is perpendicular to the ribbon direction of core 12. Likewise, top outer ply 22 and bottom outer ply 28 have a fiber direction that is parallel to the ribbon direction.

Though the preceding orientation is preferred, an alternate embodiment wherein the fiber direction of inner plies 20, 26 runs parallel to the ribbon direction of core 12 while the fiber direction of outer plies 22, 28 is perpendicular to the ribbon direction remains within the scope of the present invention.

The panels of this invention may be manufactured in a variety of sizes. For purposes of illustration, however, the following discussion concerning ply thicknesses depends from a standard panel of a thickness between about 0.39 in. (0.99 cm) and 0.41 in. (1.04 cm). This is the most common size of panel used in aircraft flooring applications.

As mentioned previously, top laminate 18 is thicker than bottom laminate 24. In the most preferred embodiment, top laminate 18 is about 1.3 (and more specifically about 1.3333) times the thickness of bottom laminate 24. This value was derived through trial and error testing to balance load bearing capability against panel stiffness and bending characteristics. The ratio of 1.3333 to 1 produces optimum results. Where the panel is of a standard thickness of 0.4 inches, top laminate 18 has a preferred thickness of about 0.01428 in. (0.36271 mm), and bottom laminate 24 has a thickness of about 0.01072 in. (0.27229 mm). Being further defined, each ply 20, 22 of top laminate 18 has a thickness of about 0.00714 in. (0.18136 mm) and each ply 26, 28 of bottom laminate 24 has a thickness of about 0.00536 in. (0.13615 mm).

The preferred areal weight of a 0.4 inch thick panel is about 0.560 lbs./ft²(2734 g/m²). In such a preferred panel, top laminate 18 has an areal weight of about 0.0934 lbs./ft² (456 g/m²), and bottom laminate 24 has an areal weight of about 0.07374 lbs./ft² (360 g/m2). It should be understood that the above areal weights are for the fibers only and do not include the resin. The total areal weight of top laminate 18 is 776 g/m², while the total areal weight of bottom laminate 24 is 637 g/m². Each ply 20, 22 of top laminate 18 has an areal weight (based on fiber) of about 0.0467 lbs./ft² (228 g/m²), and each ply 26, 28 of bottom laminate 24 has an areal weight (fiber) of about 0.03687 lbs./ft² (180 g/m²). The total areal weights (fiber and resin) of plies 20, 22, 26 and 28 are as follows: (The tighter tolerances are maintained, the better the result.)

| PLY | WT. |
|-----|-----|
| 20 | 480 g/m² |
| 22 | 296 g/m² |
| 26 | 404 g/m² |
| 28 | 232 g/m² |

A numerical formula has been derived as follows to describe the unique relationship of ply and core thickness to strength and deflection of the panels of the present invention. In this derivation, it is presumed that the thickness of top laminate 18 ('top.sheet) equals 1.3333 times the thickness of bottom laminate 24 ('bottom.sheet). The unique relationship described allows for easy adaptation of design parameters to account for specific target values. A change in stiffness is characterized by the formula:

$$0.0092(1+\% \; \Delta stiff) = 0.91(t_B) - 0.534(t_B^2) + 0.778(t_B^3)$$

where,

% $\Delta$strength=% change in strength desired,

% $\Delta$stiff=% change in stiffness desired, and $t_B$=thickness of bottom sheet.

Strength change is also quantifiable as follows:

$$[246.56/(1\% \; \Delta strength)] = -75[(1.11*10^{18}t_B - 1.52*10^{18})/(4.57*10^{18}t_B - 2.67*10^{20}t_B^2 + 3.89*10^{20}t_B^3)]$$

It should be noted that for a given percentage increase desired, the increase for stiffness will be larger than the increase required for strength. But only by a small amount.

The bottom laminate thickness required for a given change in stiffness is derived. It is presumed that the thickness of the panel is 0.4 inches.

(a) $t_T = 1.34 t_B$

Assuming a unit width panel for ease of derivation:

(b) $C_p = [t_T(t_p - 0.5t_T) + (0.5t_B^2)]/(t_T + t_B)$ (c) $I_p = t_T(t_p - 0.5t_T - C_p)^2 + t_B(0.5t_B - C_p)^2$

All ratios are based on the preferred thickness for the top laminate:

(d) $I_o = I_p$ where, $C_p$=Centroid of Panel, $I_p$=moment of inertia of panel, $I_o$=moment of inertia of original 737 floor, $t_T$=thickness of top sheet, $t_B$=thickness of bottom sheet, and $t_p$=thickness of panel.

As an example, where $t_B$=0.0107 in $t_p$=0.40 in Substitute (a) and (c) into (d):

$$I_o = 1.34 t_B(t_p - 0.67 t_B - 1.34 t_B(t_B - 0.67 t_B) + 0.214 t_B)^2 + t_B(0.5 t_B - 1.34 t_B(t_p - 0.67 t_B) + 0.214 t_B)^2$$

which expands to:

$$I_o = 0.57 t_B t_p^2 - 1.34 t_B^2 t_p + 0.78 t_B^3$$
$$I_o = 1.2*10^{-4} \text{in}^3 \quad (e)$$

Expand equation (e) and substitute in the original moment of inertia for the 737 floor. The following equation can be used to determine the bottom panel thickness required for a desired increase in bending stiffness.

$$9.2*10^{-4}(1+\% \; \Delta stiff) = 0.57 t_B t_p^2 - 1.34 t_B^2 t_p + 0.78 t_B^3$$

The bottom laminate thickness required for a given change in strength is derived as follows:

Solve the following equation:

(f) $MC_p/I_o = (MC_{new}/I_{new})(1+\% \; \Delta strength)$

... substitute (b) into (f):

(g) $(1.34 t_B(t_p - 0.67 t_B) + 0.5 t_B^2)/(2.34 t_B * I_o) = (C_{new}/I_{new})(1+\% \; \Delta strength)$ Solve for the constant that represents the left side of the equation:

$$(1.34 t_B(t_p - 0.67 t_B) + 0.5 t_B^2)/(2.34 t_B * I_o) = 246.56 \text{ in}^2$$

Insert the above constant into (g):

(h) $246.56 = (C_{new}/I_{new})(1+\% \; \Delta strength)$

Insert (b) and (e) into (h):

$$246.56 = [(1.34 t_B(t_p - 0.67 t_B) + 0.5 t_B^2)/(2.34 t_B(0.57 t_B t_p^2 - 1.34 t_B^2 t_p + 0.78 t_B^3))](1+\% \; \Delta strength)$$

Simplifying the above equation yields the following equation, which can be used to determine the bottom panel thickness required for a desired increase in strength.

$$246.56/(1+\% \; \Delta strength) = -75[(1.11*10^{18}t_B - 1.52*10^{18})/4.57*10^{18}t_B - 2.67*10^{20}t_B^2 + 3.89*10^{20}t_B^3)$$

While the invention has been described with a certain degree of particularity, it is manifest that many changes may be made in the method hereinabove described without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A multi-layered, unbalanced, bonded sandwich panel having improved top load support capability per unit of weight, which comprises:

(a) a core;

(b) a multiple-ply top laminate for resisting compressive forces; and (c) a multiple-ply bottom laminate for resisting tensile forces, said bottom laminate having the same number of plies as said top laminate;

wherein said multiple-plies of said top laminate and said bottom laminate comprise unidirectional fiber and resin layers of varied areal weights applied to said core such that the total areal weight of said top laminate is greater than the total areal weight of said bottom laminate.

2. The panel according to claim 1, wherein said core is a honeycomb core.

3. The panel according to claim 1, wherein each ply of said top laminate is a unidirectional, fiberglass epoxy prepreg lamina.

4. The panel according to claim 1, wherein each ply of said top laminate is a unidirectional, fiberglass epoxy prepreg lamina.

5. A multi-layered, unbalanced sandwich panel having improved top load support capability per unit of weight, which comprises:

(a) a honeycomb core having an upper surface, a lower surface, and a known ribbon direction;

(b) a top laminate for resisting compressive forces affixed to said upper surface, said top laminate comprising an inner, unidirectional, fiberglass epoxy prepreg ply having a fiber direction perpendicular to said ribbon direction and an outer, unidirectional, fiberglass epoxy prepreg ply having a fiber direction parallel to said ribbon direction; and (c) a bottom laminate for resisting tensile forces affixed to said lower surface, said bottom laminate comprising an inner, unidirectional, fiberglass epoxy prepreg ply having a fiber direction perpendicular to said ribbon direction and an outer, unidirectional, fiberglass epoxy prepreg ply having a fiber direction parallel to said ribbon direction, said bottom laminate having the same number of plies as said top laminate;

wherein said multiple-plies of said top laminate and said bottom laminate are of varied areal weights and are applied to said core such that the total areal weight of said top laminate is greater than the total areal weight of said bottom laminate.

6. The panel according to claim 5, wherein said top laminate is about 1.3 times the thickness of said bottom laminate.

7. The panel according to claim 5, wherein the thickness of said panel is between about 0.39 in. (0.99 cm) and 0.41 in. (1.04 cm).

8. The panel according to claim 7, wherein said top laminate has a thickness of about 0.01428 in. (0.36271 mm) and said bottom laminate has a thickness of about 0.01072 in. (0.27229 mm).

9. The panel according to claim 8, wherein each ply of said top laminate has a thickness of about 0.00714 in. (0.18136 mm) and each ply of said bottom laminate has a thickness of about 0.00536 in. (0.13615 mm).

10. The panel according to claim 9, wherein each panel has an areal weight of about 0.56 lbs./ft$^2$ (2734 g/m$^2$).

11. The panel according to claim 10, wherein said top laminate has an areal weight of about 0.09831 lbs./ft$^2$(456 g/m$^2$) and said bottom laminate has an areal weight of about 0.07374 lbs./ft$^2$(360 g/m$^2$).

12. The panel according to claim 11, wherein each ply of said top laminate has an areal weight of about 0.04916 lbs./ft$^2$(228 g/m$^2$) and each ply of said bottom laminate has an areal weight of about 0.03687 lbs./ft$^2$(180 g/m$^2$).

13. An improved structural sandwich panel comprising a core bonded between a multiple-ply top surface covering and a multiple-ply bottom surface covering, said top surface covering and said bottom surface covering having an equal number of plies, said panel being oriented in use such that said top surface covering resists compressive forces while said bottom surface covering resists tensile forces, said multiple-plies of said top surface covering and said bottom surface covering being of varied areal weights and being applied to said core such that the total areal weight of said top surface covering is greater than the total areal weight of said bottom surface covering.

14. A multi-layered light weight unbalanced, bonded sandwich panel of predetermined maximum thickness comprising:

a light weight core of selected thickness having a top and a bottom surface;

a multiple ply top laminate of selected material and minimum thickness to resist compressive forces induced in the top laminate when the panel is subjected to a predetermined maximum bending moment required to support a predetermined top load; and a multiple ply bottom laminate of selected material and minimum thickness to resist tensile forces induced in the bottom laminate when the panel is subjected to said predetermined maximum bending moment required to support said predetermined top load, said top and bottom laminates being bonded to said core top and bottom surfaces respectively, the thicknesses of said core, said top laminate and said bottom laminate totaling not greater than said panel predetermined maximum thickness.

15. The panel according to claim 14, wherein said core is a honeycomb core.

16. The panel according to claim 14, wherein each ply of said top laminate is a unidirectional, fiberglass epoxy lamina.

17. The panel according to claim 14, wherein each ply of said top laminate and said bottom laminate is a unidirectional, fiberglass epoxy prepreg lamina.

* * * * *

UNITED STATES PATENT AND TRADEMARK OFFICE
CERTIFICATE OF CORRECTION

PATENT NO. : 5,667,866

DATED : September 16, 1997

INVENTOR(S) : Roy Jefferson REESE, Jr.

It is certified that error appears in the above-identified patent and that said Letters Patent is hereby corrected as shown below:

Col. 3, line 51, delete "around" and insert --aramid--

Col. 4, line 60, delete (360 g/m2) and insert --(360 g/m$^2$)--

Col. 5, line 56, after "$t_p=0.40$ in", put "Substitute (a) and (c) into (d):" on a new line Col. 5, line 64, delete "$I_o$ = ].2*10$^{-4}$in$^3$" and insert -- → $I_o$ = 9.2*10$^{-4}$in$^3$--

Col. 6, line 9, delete "(f) MC$_o$/I$_o$ = (MC$_{new}$/I$_{new}$)(1+%Δ strength)" and insert --(f) MC$_o$/I$_o$ = (MC$_{new}$/I$_{new}$)(1 + %Δ strength)--

Signed and Sealed this

Sixteenth Day of December, 1997

*Attest:*

BRUCE LEHMAN

*Attesting Officer*     *Commissioner of Patents and Trademarks*